US010027680B1

(12) United States Patent
Saylor

(10) Patent No.: US 10,027,680 B1
(45) Date of Patent: *Jul. 17, 2018

(54) THIRD-PARTY AUTHORIZATION OF USER CREDENTIALS

(71) Applicant: MicroStrategy Incorporated, Vienna, VA (US)

(72) Inventor: Michael J. Saylor, Vienna, VA (US)

(73) Assignee: MicroStrategy Incorporated, Vienna, VA (US)

(*) Notice: Subject to any disclaimer, the term of this patent is extended or adjusted under 35 U.S.C. 154(b) by 152 days.

This patent is subject to a terminal disclaimer.

(21) Appl. No.: 14/853,623

(22) Filed: Sep. 14, 2015

Related U.S. Application Data

(63) Continuation of application No. 13/874,721, filed on May 1, 2013, now Pat. No. 9,154,303.

(60) Provisional application No. 61/785,089, filed on Mar. 14, 2013.

(51) Int. Cl.
*H04L 9/32* (2006.01)
*G06F 21/00* (2013.01)
*H04L 29/06* (2006.01)

(52) U.S. Cl.
CPC ............ *H04L 63/123* (2013.01); *H04L 63/08* (2013.01)

(58) Field of Classification Search
CPC ..... H04L 63/08; H04L 63/083; H04L 63/123; H04L 9/3202; H04L 63/10; H04L 9/32; H04W 12/06; H04W 12/04
USPC .................. 726/2–7; 713/155, 168–171, 182
See application file for complete search history.

(56) References Cited

U.S. PATENT DOCUMENTS

| | | | |
|---|---|---|---|
| 5,668,874 | A | 9/1997 | Kristol |
| 5,918,228 | A | 6/1999 | Rich et al. |
| 6,023,769 | A | 2/2000 | Gonzalez |
| 6,477,645 | B1 | 11/2002 | Drews |
| 6,668,322 | B1 | 12/2003 | Wood et al. |
| 6,715,082 | B1 | 3/2004 | Chang et al. |
| 6,754,823 | B1 | 6/2004 | Kurzweil et al. |
| 6,993,658 | B1 | 1/2006 | Engberg et al. |
| 7,216,109 | B1 | 5/2007 | Donner |
| 7,225,464 | B2 | 5/2007 | Satyavolu et al. |
| 7,266,693 | B1 | 9/2007 | Potter et al. |
| 7,356,837 | B2 | 4/2008 | Asghari-Kamrani et al. |
| 7,379,393 | B2 | 5/2008 | Morykwas et al. |

(Continued)

OTHER PUBLICATIONS

U.S. Final Office Action for U.S. Appl. No. 15/043,202, dated Jul. 26, 2016, 24 pages.

(Continued)

*Primary Examiner* — Shanto M Abedin
(74) *Attorney, Agent, or Firm* — Fish & Richardson P.C.

(57) ABSTRACT

In one implementation, a client device receives a request from a user to output a representation for a credential of the user. In response to receiving the request from the user to output the representation for the credential of the user, the client device obtains data identifying a third-party having authority to grant the user access to the credential of the user. The client device then obtains a representation of a credential associated with the third-party and validates the representation of the credential associated with the third-party. In response to validating the representation of the credential associated with the third-party, the client device outputs the representation for the credential of the user.

20 Claims, 7 Drawing Sheets

(56) References Cited

U.S. PATENT DOCUMENTS

| | | | |
|---|---|---|---|
| 7,454,349 B2 | 11/2008 | Teunen et al. | |
| 7,475,812 B1 | 1/2009 | Novozhenets | |
| 7,512,254 B2 | 3/2009 | Vollkommer et al. | |
| 7,694,130 B1 | 4/2010 | Martinez | |
| 7,814,538 B2 | 10/2010 | Kuehnel et al. | |
| 7,882,549 B2 | 2/2011 | Edwards | |
| 7,941,835 B2* | 5/2011 | Wolfond | G06F 21/31 713/186 |
| 8,087,072 B2* | 12/2011 | Gajjala | G06F 21/33 713/168 |
| 8,117,459 B2 | 2/2012 | Cameron et al. | |
| 8,181,236 B2 | 5/2012 | Banerjee | |
| 8,201,232 B2* | 6/2012 | Zhang | G06F 21/31 380/270 |
| 8,234,220 B2 | 7/2012 | Weiss | |
| 8,234,494 B1 | 7/2012 | Bansal et al. | |
| 8,255,971 B1 | 8/2012 | Webb et al. | |
| 8,295,855 B2 | 10/2012 | Narayan et al. | |
| 8,613,052 B2 | 12/2013 | Weiss | |
| 8,739,260 B1 | 5/2014 | Damm-Goossens | |
| 8,752,145 B1 | 6/2014 | Dotan et al. | |
| 8,775,807 B1* | 7/2014 | Vazquez | G06F 21/31 713/168 |
| 9,027,099 B1 | 5/2015 | Saylor et al. | |
| 9,154,303 B1 | 10/2015 | Saylor | |
| 9,264,415 B1 | 2/2016 | Saylor | |
| 9,269,358 B1 | 2/2016 | Saylor | |
| 2002/0026593 A1 | 2/2002 | Sakuma et al. | |
| 2002/0078243 A1 | 6/2002 | Rich et al. | |
| 2002/0141586 A1 | 10/2002 | Margalit et al. | |
| 2004/0003260 A1* | 1/2004 | Hawkes | G06F 21/6209 713/185 |
| 2004/0054898 A1 | 3/2004 | Chao et al. | |
| 2004/0153649 A1 | 8/2004 | Rhoads | |
| 2004/0234131 A1 | 11/2004 | Kondo | |
| 2005/0033837 A1 | 2/2005 | Bohannon | |
| 2005/0165667 A1 | 7/2005 | Cox | |
| 2005/0166263 A1 | 7/2005 | Nanopoulos et al. | |
| 2005/0238208 A1 | 10/2005 | Sim | |
| 2007/0050635 A1 | 3/2007 | Popp | |
| 2007/0061730 A1 | 3/2007 | Kuenzi | |
| 2007/0277224 A1 | 11/2007 | Osborn et al. | |
| 2008/0071537 A1 | 3/2008 | Tamir et al. | |
| 2008/0163361 A1 | 7/2008 | Davis | |
| 2008/0178271 A1* | 7/2008 | Gajjala | G06F 21/33 726/6 |
| 2008/0256594 A1 | 10/2008 | Satish | |
| 2009/0097661 A1 | 4/2009 | Orsini | |
| 2009/0117883 A1 | 5/2009 | Coffing et al. | |
| 2009/0119757 A1* | 5/2009 | Acuna | G06F 21/6245 726/5 |
| 2009/0187975 A1* | 7/2009 | Edwards, Jr. | G06F 21/31 726/4 |
| 2009/0239503 A1* | 9/2009 | Smeets | H04L 63/06 455/411 |
| 2009/0292641 A1 | 11/2009 | Weiss | |
| 2010/0031051 A1 | 2/2010 | Machani | |
| 2010/0082491 A1 | 4/2010 | Rosenblatt et al. | |
| 2010/0098256 A1 | 4/2010 | Kirshenbaum | |
| 2010/0116880 A1 | 5/2010 | Stollman | |
| 2010/0169958 A1 | 7/2010 | Werner | |
| 2010/0269156 A1 | 10/2010 | Hohlfeld | |
| 2011/0270751 A1 | 11/2011 | Csinger et al. | |
| 2011/0321144 A1 | 12/2011 | Saxena | |
| 2012/0028609 A1 | 2/2012 | Hruska | |
| 2012/0144203 A1 | 6/2012 | Albisu | |
| 2012/0191575 A1 | 7/2012 | Vilke | |
| 2012/0253809 A1 | 10/2012 | Thomas et al. | |
| 2012/0257759 A1 | 10/2012 | Nick et al. | |
| 2012/0274444 A1 | 11/2012 | Micali | |
| 2012/0291108 A1 | 11/2012 | Talamo | |
| 2013/0037607 A1 | 2/2013 | Bullwinkel | |
| 2013/0061301 A1 | 3/2013 | Novak | |
| 2013/0074168 A1 | 3/2013 | Hao | |
| 2013/0111056 A1 | 5/2013 | Prasad | |
| 2013/0111571 A1* | 5/2013 | Jakobsson | G06F 21/36 726/6 |
| 2013/0112760 A1 | 5/2013 | Schory et al. | |
| 2013/0124292 A1 | 5/2013 | Juthani | |
| 2013/0124855 A1 | 5/2013 | Varadarajan | |
| 2013/0125231 A1 | 5/2013 | Kuenzi | |
| 2013/0132091 A1 | 5/2013 | Skerpac | |
| 2013/0139233 A1 | 5/2013 | Malty | |
| 2013/0173915 A1 | 7/2013 | Haulund | |
| 2013/0276075 A1 | 7/2013 | Gong | |
| 2013/0198264 A1 | 8/2013 | Hellman | |
| 2013/0205360 A1 | 8/2013 | Novak | |
| 2013/0222835 A1 | 8/2013 | Iwamoto | |
| 2013/0227710 A1 | 8/2013 | Barak | |
| 2013/0263211 A1 | 10/2013 | Neuman et al. | |
| 2013/0282588 A1 | 10/2013 | Hruska | |
| 2013/0325704 A1 | 12/2013 | Gorman et al. | |
| 2014/0001253 A1 | 1/2014 | Smith | |
| 2014/0040139 A1 | 2/2014 | Brudnicki | |
| 2014/0245417 A1* | 8/2014 | Hu | H04L 63/0807 726/7 |
| 2014/0281525 A1 | 9/2014 | Acar et al. | |

OTHER PUBLICATIONS

Lei, "Similarity Between the Mandelbrot Set and Julia Sets," Commun. Math. Phys. 134, 587-617, 1990.

Mills, "The Autokey Security Architecture, Protocol and Algorithms," Technical Report 06-1-1, Jan. 2006, 61 pages.

Open Intents—(O1 Countdown, Feb. 5, 2011, 3 pages).

Oprea et al., "Securing a Remote Terminal Application with a Mobile Trusted Device," ACSAC'04, 2004, 10 pages.

U.S. Non-Final Office Action for U.S. Appl. No. 13/914,296 dated Jun. 17, 2015, 29 pages.

U.S. Non-Final Office Action for U.S. Appl. No. 13/914,408 dated Jun. 17, 2015, 22 pages.

U.S. Non-Final Office Action for U.S. Appl. No. 13/914,403 dated Jun. 2, 2015, 16 pages.

U.S. Notice of Allowance in U.S. Appl. No. 13/914,403 dated Oct. 8, 2015, 12 pages.

U.S. Notice of Allowance in U.S. Appl. No. 13/914,373 dated Oct. 16, 2015, 31 pages.

U.S. Non-Final Office Action for U.S. Appl. No. 13/957,020 dated Mar. 11, 2016, 12 pages.

U.S. Non-Final Office Action for U.S. Appl. No. 15/040,777 dated Apr. 13, 2016, 20 pages.

U.S. Non-Final Office Action for U.S. Appl. No. 15/043,202 dated Apr. 13, 2016, 20 pages.

"Transport Operators and Barcode M-Ticketing: Expand station sales capacity without spending more on staff and ticket machines," Masabi, London, UK, publicly available before Jun. 10, 2013, 2 pages.

Essa et al., M.I.T Media Laboratory Perceptual Computing Section Technical Report No. 370 Appears: Proceedings of Computer Animation '96 Conference, Geneva, Switzerland, Jun. 1996, pp. 1-12.

Jain et al. "An Introduction to Biometric Recognition," IEEE Transactions on Circuits and Systems for Video Technology vol. 14, No. 1, Jan. 2004, pp. 4-20.

McBryan, "Textual Associations from Images Applied to Authentication," Masters Thesis 2005/2006, pp. 1-106.

Rail Industry Meetings [online]. "Masabi and MBTA to launch first smartphone rail ticketing system in the US," Mar. 2012, [Retrieved on Jun. 14, 2012]. Retrieved from the Internet: <URL: http://www.abe-industry.com/railim/index.php/en/newsflash/788-masabi-and-mbta-to-launch-first-smartphone-rail-ticketing-system-in-the-us.html>. 2 pages.

Ray, "Apple Passbook card-'n'-ticket app paves way for iOS e-wallet," The Register, Jun. 12, 2012, [Retrieved on Jun. 14, 2012]. Retrieved from the Internet: <URL: http://www.theregister.co.uk/2012/06/12/apple_passbook/>. 3 pages.

Rooney "Masabi Launches U.S.'s First Ticketless Rail System," The Wall Street Journal, Apr. 2012, [Retrieved on Jun. 14, 2012].

(56) References Cited

OTHER PUBLICATIONS

Retrieved from the Internet: <URL: http://blogs.wsj.com/tech-europe/2012/04/23/masabi-launches-u-s-s-first-ticketless-rail-system/>. 3 pages.
Saragih et al., "Realtime avatar animation from a single image." Automatic Face & Gesture Recognition and Workshops (FG 2011), 2011 IEEE International Conference on. IEEE, 2011, pp. 117-124.
Weir et al., "Testing Metrics for Password Creation Policies by Attacking Large Sets of Revealed Passwords," CCS'10, Oct. 4-8, 2010, pp. 162-175.
U.S. Non-Final Office Action for U.S. Appl. No. 13/914,296 dated Oct. 22, 2014, 18 pages.
U.S. Final Office Action for U.S. Appl. No. 13/914,296 dated Feb. 5, 2015, 15 pages.
U.S. Notice of Allowance in U.S Appl. No. 13/914,353 dated Dec. 8, 2014, 19 pages.
U.S. Notice of Allowance in U.S. Appl. No. 13/914,353 dated Mar. 27, 2015, 9 pages.
U.S. Non-Final Office Action for U.S. Appl. No. 13/914,373 dated Apr. 6, 2015, 18 pages.
U.S. Non-Final Office Action for U.S. Appl. No. 13/914,408 dated Nov. 13, 2014, 22 pages.
U.S. Final Office Action for U.S. Appl. No. 13/914,408 dated Mar. 9, 2015, 23 pages.
U.S. Non-Final Office Action for U.S. Appl. No. 13/914,403 dated Nov. 7, 2014, 12 pages.
U.S. Final Office Action for U.S. Appl. No. 13/914,403 dated Feb. 26, 2015, 13 pages.
U.S. Non-Final Office Action for Appl. No. 13/914,429 dated Sep. 11, 2014, 16 pages.
U.S. Final Office Action for U.S. Appl. No. 13/914,429 dated Jan. 14, 2015, 15 pages.
Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.
Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.
Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.
Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.
Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 8, 2015]. Retrieved from the Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.
Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.
Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.
Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.
U.S. Non-Final Office Action for U.S. Appl. No. 13/874,721, dated Nov. 4, 2014, 13 pages.
U.S. Non-Final Office Action for Application No. 13/914,408 dated Nov. 13, 2014, 22 pages.
U.S. Non-Final Office Action for U.S. Appl. No. 13/914,429 dated Sep. 11, 2014, 16 pages.
U.S. Notice of Allowance in Application No. 13/874,721 dated Jun. 4, 2015, 14 pages.
Fazackerley, Mark, "The Usher Identity Platform: A description of MicroStrategy's mobile identity solution," Usher by Microstrategy, Apr. 2014, 15 pages, URL<https://www.slideshare.net/markfazackerley3/usher-functionality>.
Cahill et al., "Micro Strategy Introduces Enterprise Security Platform Usher, Debuts Usher Software Development Kit," MicroStrategy, Apr. 2015, 4 pages, URL<http://ir.microstrategy.com/releasedetail.cfm?releaseid=904735>.
"Introduction to Usher," Usher by MicroStrategy, May 2014, 10 pages, URL<https://mobileapps.microstrategy.com/usher/MSTREmployeeFAQ/MSTREmployeeFAQ.html>.
"MicroStrategy Usher: the revolutionary new security solution," MicroStrategy, 2015, 20 pages, URL<https://www.microstrategy.com/Strategy/media/downloads/Resource%20Center/security/Whitepaper-UsherSecurityArch.pdf>.
Lee, Justin, "Inside Micro Strategy's biometric mobile identity platform Usher," Biometrics Research Group, Inc., Apr. 2, 2015, 5 pages, URL<http://www.biometricupdate.com/201504/inside-microstrategys-biometric-mobile-identity-platform-usher>.

* cited by examiner

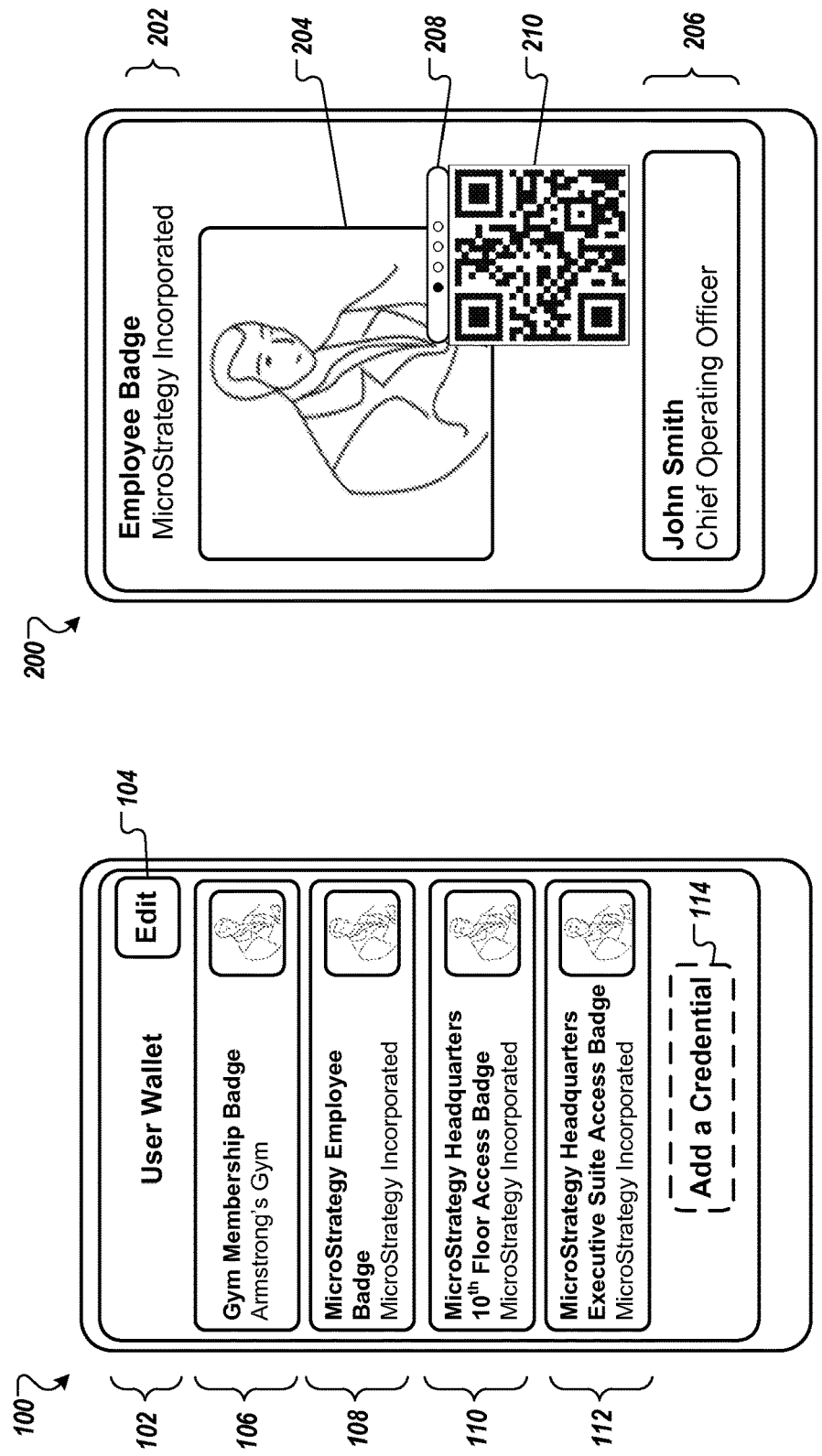

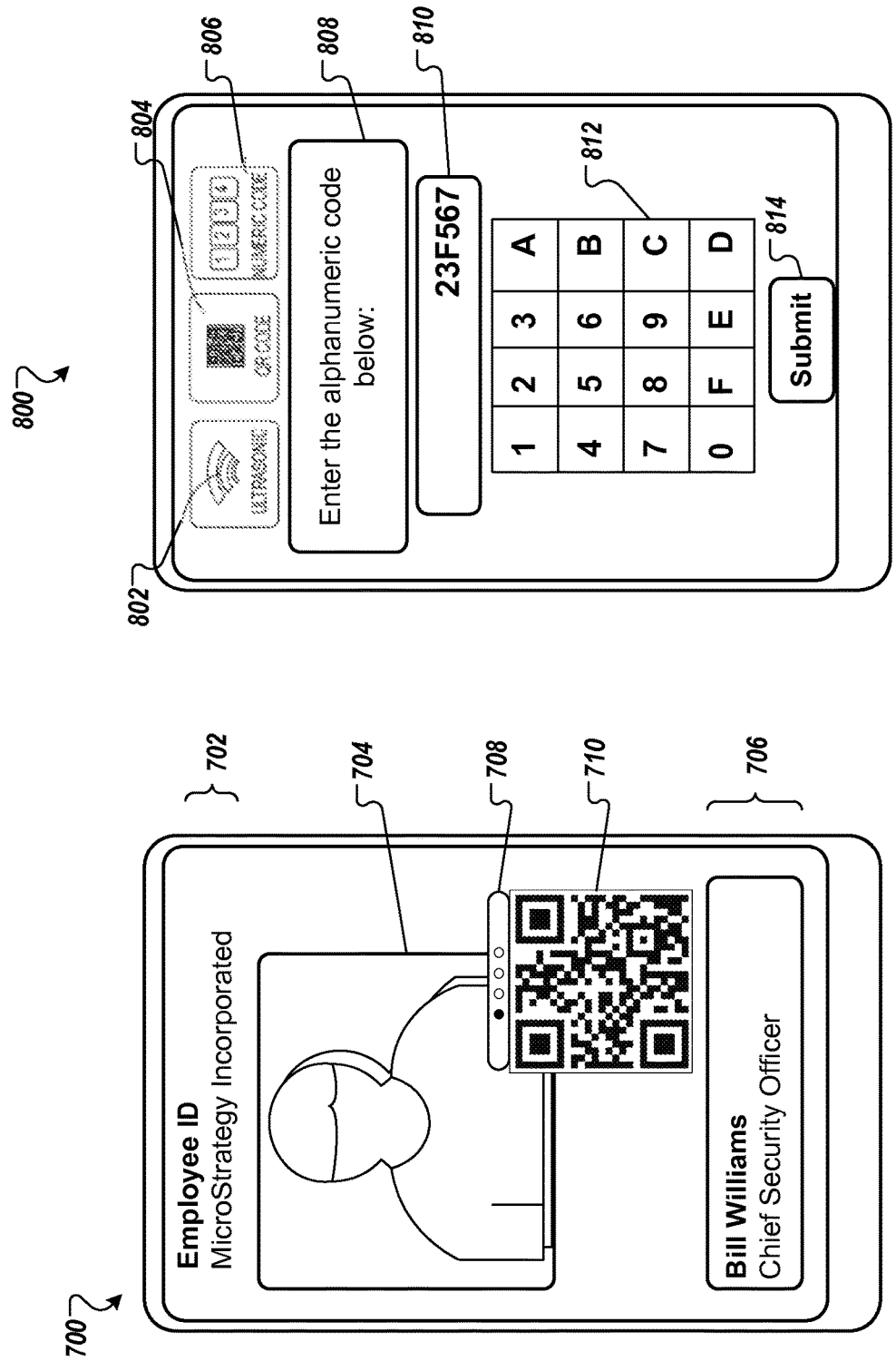

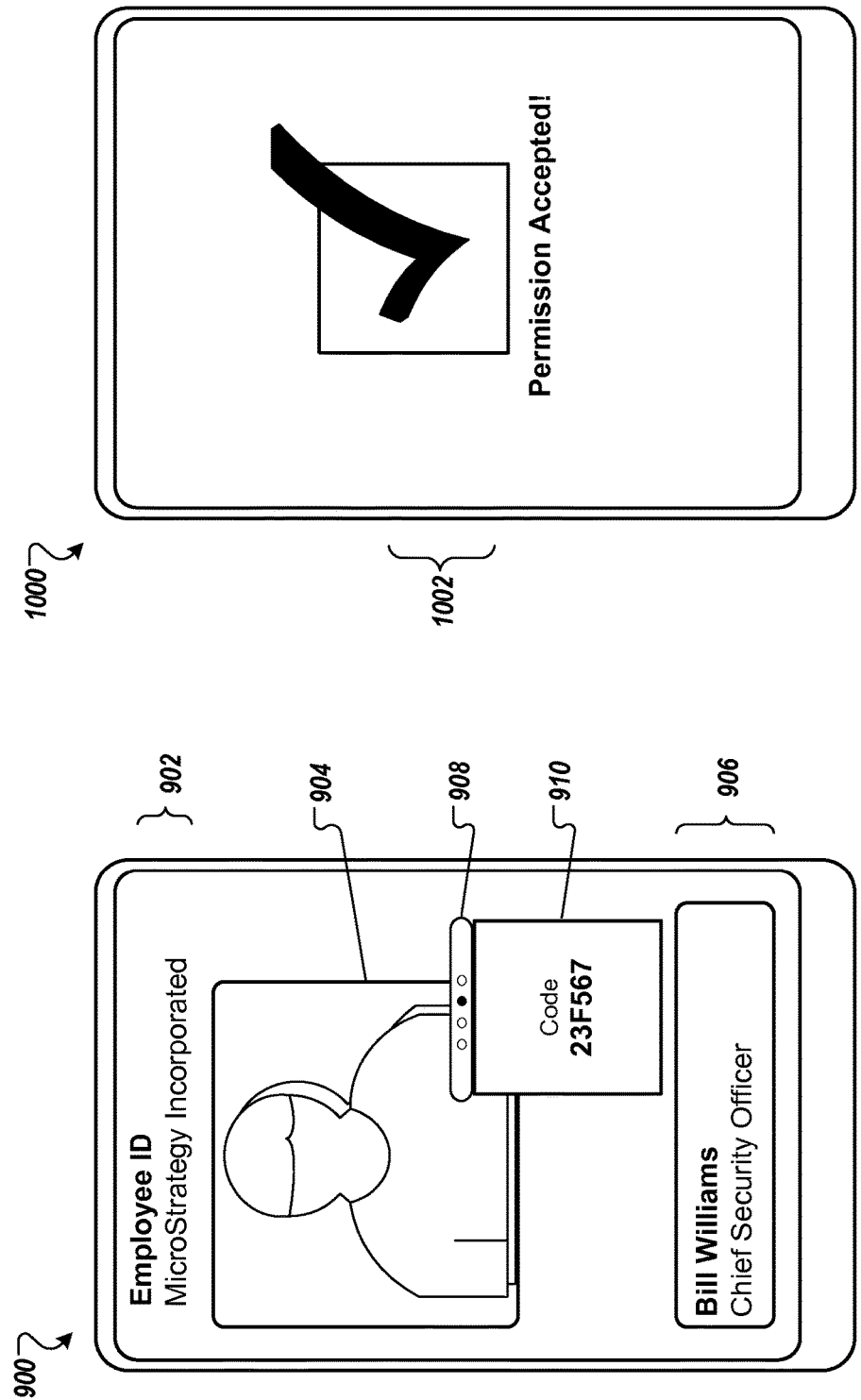

THIRD-PARTY AUTHORIZATION OF USER CREDENTIALS

CROSS-REFERENCE TO RELATED APPLICATION

This application is a continuation of, and claims priority under 35 U.S.C. § 120 from, U.S. patent application Ser. No. 13/874,721, filed on May 1, 2013, which claims the benefit of U.S. Patent Application No. 61/785,089, filed on Mar. 14, 2013. Both of these prior applications are incorporated herein by reference in their entirety.

TECHNICAL FIELD

This specification generally relates to user credentials.

BACKGROUND

A person may be associated with a credential that, for example, permits the person to access locations and/or events.

SUMMARY

In general, one aspect of the subject matter described in this specification may include receiving, at a client device associated with a user, a request from the user to output a representation for a credential of the user. In response to receiving the request from the user to output the representation for the credential of the user, the client device obtains data identifying a third-party having authority to grant the user access to the credential of the user. The client device obtains a representation of a credential associated with the third-party and validates the representation of the credential associated with the third-party. In response to validating the representation of the credential associated with the third-party, the client device outputs the representation for the credential of the user.

In some aspects, when the client device obtains a representation of a credential associated with the third-party, the client device may obtain, from a client device of the third-party, a time-varying representation for a credential of the third-party. Additionally, the client device may validate the representation of the credential associated with the third-party by decoding the time-varying representation for the credential to generate a set of alphanumeric characters. The set of alphanumeric characters may be data corresponding to: a key, a credential identifier, and a time at the client device of the third-party, where the key is associated with the third-party, and where the credential identifier identifies the credential of the third-party. Then, the client device may transmit a validation request to a server, where the validation request includes data corresponding to the key, the credential identifier, and the time. Finally, the client device may receive validation response from the server, the validation response indicating that the credential of the third-party is validated.

In some implementations, obtaining a time-varying representation for a credential of the third-party may comprise scanning, from a client device of a third-party, a time-varying optical machine-readable representation for a credential. And decoding the time-varying representation for the credential to generate a set of alphanumeric characters may comprise decoding the scanned time-varying optical machine-readable representation for the credential to generate a set of alphanumeric characters.

In some implementations, obtaining a time-varying representation for a credential of the third-party may comprise receiving, at a microphone operatively coupled to the client device of the user from a speaker of a client device of the third-party, a sound signal encoding the set of alphanumeric characters corresponding to the time-varying representation for the credential. And decoding the time-varying representation for the credential to generate a set of alphanumeric characters may comprise decoding the received sound signal to generate a set of alphanumeric characters.

In some implementations, obtaining a time-varying representation for a credential of the third-party may comprise receiving, at the client device of the user from a client device of a third-party, data representing a credential transmitted via near field communications. And decoding the time-varying representation for the credential to generate a set of alphanumeric characters may comprise decoding, at the client device, the received data representing the credential to generate a set of alphanumeric characters.

In some implementations, obtaining a representation of a credential associated with the third-party may comprise obtaining, at the client device of the user from the third-party, an alphanumeric code representing a credential of the third-party. In such implementations, validating the representation of the credential from the third-party may comprise transmitting a validation request to a server, wherein the validation request includes the alphanumeric code, and receiving a validation response from the server, the validation response indicating that the credential of the third-party is validated. The client device may receive, at a keypad of the client device, an input from the user corresponding to the alphanumeric code.

In some aspects, receiving a request from the user to output a representation for a credential of the user may comprise receiving, at a client device associated with a user, a request from the user to output a representation for a first credential of the user. In response to receiving the request from the user to output the representation for the first credential of the user, the client device may obtain data identifying a first third-party having authority to grant the user access to the first credential of the user. The client device may then obtain a representation of a credential associated with the first third-party. The client device then validates the representation of the credential associated with the first third-party, and, in response to validating the representation of the credential associated with the first third-party, outputting, from the client device, the representation for the first credential of the user.

The client device may then receive a request from the user to output a representation for a second credential of the user. In response to receiving the request from the user to output the representation for the second credential of the user, the client device obtains data identifying a second third-party having authority to grant the user access to the second credential of the user. The client device then obtains a representation of a credential associated with the second third-party and validates the representation of the credential associated with the second third-party. In response to validating the representation of the credential associated with the second third-party, the client device outputs the representation for the second credential of the user.

Some implementations involve obtaining a time period during which third-party authorization is required to access the credential. Such implementations may include determining that a current time is within the time period, and in response to receiving the request from the user to output the representation for the credential of the user and having determined that the current time is within the time period, obtaining, at the client device, data identifying a third-party having authority to grant the user access to the credential of the user.

In some aspects, the data identifying a third-party having authority to grant the user access to the credential of the user may comprise data identifying one or more specific individuals having authority to grant the user access to the credential of the user. Alternatively or in addition, the data identifying one or more specific individuals having authority to grant the user access to the credential of the user further may comprise location information for the one or more specific individuals having authority to grant the user access to the credential of the user. Additionally, the data identifying a third-party having authority to grant the user access to the credential of the user may comprise data identifying a type of credential to be provided by the third-party to grant the user access to the credential of the user.

Some implementations involve receiving, at the client device, confirmation from a client device associated with the third-party that the third-party intends to grant the user access to the credential of the user.

Some implementations include initiating recording of information identifying the third-party who granted the user access to the credential of the user.

In some implementations, validating the representation of the credential associated with the third-party comprises decoding a certificate associated with the third-party from the representation of the credential, and determining that the certificate associated with the third-party is valid.

Some implementations include, in response to validating the representation of the credential associated with the third-party, receiving, at the client device of the user from a server, data encoding the credential of the user.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to select from among various credentials.

FIG. 2 is an illustration of an example of a representation of a credential.

FIG. 7 is an illustration of an example user interface on a client device of a third-party that provides an optical machine readable representation for a third-party's credential.

FIG. 8 is an illustration of an example user interface for validating an alphanumeric code representing a credential.

FIG. 9 is an illustration of an example user interface on a client device of a third-party that provides an alphanumeric code representing a third-party's credential.

FIG. 10 is an illustration of an example screen notifying a user that they have been authorized to access a credential.

DETAILED DESCRIPTION

Figure 4:
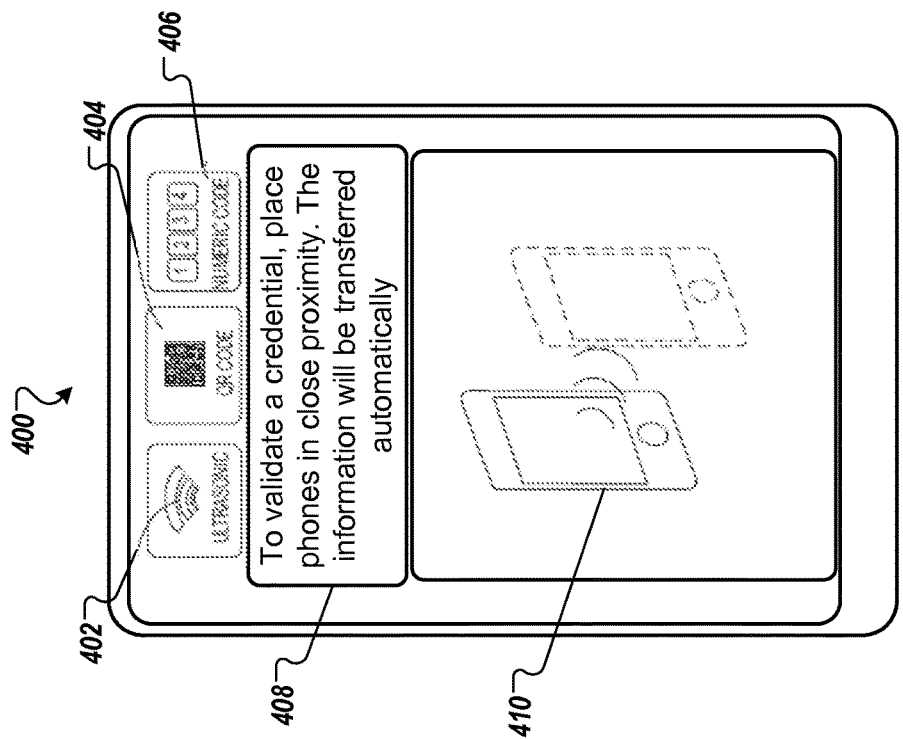
FIG. 4 is an illustration of an example user interface for validating a sound signal or near-field communication representing a credential.

In some instances, representations of credentials for groups of users or for individuals are generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Furthermore, conditions on the operability of the credentials may be applied to the credentials, for example, a credential of a user may only be operational (e.g., capable of being displayed and/or validated) after being approved for use by a third party who is authorized to unlock (e.g., grant the user access to) the credential. As referred to herein, a third-party may be a person or entity other than the user attempting to access a credential.

In some implementations, a third-party may unlock the user's credential by presenting one of the third-party's credentials to the user's client device, which then validates the third-party's credential and unlocks the user's credential. In an exemplary scenario, when a new employee attempts to access an employee badge, a security manager for the company may provide a representation of the security manager's credential to the new employee. A client device of the new employee then validates the credential of the security manager and permits the new employee to access the employee badge.

Credentials can be maintained on and/or accessed from client devices (e.g., mobile computing devices like smart phones and tablet computers) and credentials can be represented in various forms. A server, or collection of servers, can manage and distribute credentials to appropriate users' client devices. Users and third-parties may operate the client devices to present representations of the credentials for validation, and the representations may be validated using suitable mechanisms.

Examples of different representations for credentials and mechanisms for validating the different representations will now be described. In certain implementations, credentials can be represented by alphanumeric codes, optical machine-readable representations, sound signals, and/or near-field communication (NFC) signals.

A first form of representation for a credential is an alphanumeric code. As referred to herein, an alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices.

To validate an alphanumeric code, a user or third-party presents the alphanumeric code to a validating device (e.g., a client device operated by a user or a processing system operated by a validating entity). The validating device may validate the alphanumeric code by transmitting a validation request message, which includes the alphanumeric code, to the server. When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server sends the validating device a validation response indicating that the representation for the credential was valid (e.g., the presented alphanumeric code matches a valid alphanumeric code for the credential). In turn, the validating device may then provide an indication that the representation presented by the user or the third-party was valid.

Alternatively or in addition, a validating device may validate an alphanumeric code for a credential locally without requiring interaction with a server. For example, the representation for the credential provided by the third-party may be associated with a certificate associated with the third-party (e.g., a public key infrastructure (PKI) certificate), which may be stored locally at the validating device. The validating device may then compare information decoded from the alphanumeric code with information from the certificate to determine that the alphanumeric code is valid.

Another form of representation for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a QR code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. A validating device can scan the portion of the client device's display showing the representation of the credential and decode the representation of the credential to generate a set of alphanumeric characters that were encoded in the representation of the credential. In particular, the validating device may output a reticle defining a field of view from a camera operatively coupled to the validating device. This reticle can be used to scan the optical machine-readable representation of the credential from the relevant portion of the client device's display.

The validating device may use any suitable mechanism to scan and decode the optical machine-readable representation of the credential. For example, the validating device may access a function or library routine that captures and decodes QR codes and/or barcodes using a camera operatively coupled to the validating device. Suitable libraries may include, for example, Red Laser or Zxing.

In some implementations, the validating device may then validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the representation for the credential was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an optical machine-readable representation locally without requiring interaction with a server. For example, the optical machine-readable representation for the credential may include a certificate associated with the client device of the user or third-party presenting the optical machine-readable representation for validation. Alternatively or in addition, the representation for the credential may be associated with a certificate that is already stored locally at the validating device. The validating device may then compare information decoded from the optical machine-readable representation with information from the certificate to determine that the optical machine-readable representation is valid.

Yet another form of representation for a credential is a sound signal. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including or representing a corresponding credential identifier and any other suitable data. In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The client device can then output the sound signal representation of the credential from a speaker coupled to the client device for reception by a validating device.

To initiate the validation process for a sound signal, a client device outputs a sound signal representing a credential. A validating device may then receive the sound signal at a speaker of the validating device and decode the sound signal representation of the credential to generate a set of alphanumeric characters that were encoded in the sound signal. The validating device may use any suitable mechanism to receive and decode the sound signal.

In some implementations, the validating device may then validate the sound signal by transmitting a validation request message to a server. The validation request message may include data corresponding to the alphanumeric characters that were encoded in the sound signal. When the server receives the validation request message, it attempts to confirm that the presented sound signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the sound signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from a sound signal locally without requiring interaction with a server. For example, the sound signal may include a certificate associated with the client device of the user presenting the sound signal for validation. Alternatively or in addition, the representation for the credential may be associated with a certificate that is already stored locally at the validating device. The validating device may then compare information decoded from the sound signal with information from the certificate to determine that the sound signal is valid.

Still another form of representation for a credential is a NFC signal. NFC as described herein is a set of standards (e.g., ECMA-340 and ISO/IEC 18092) for client devices to establish radio communication with each other by touching them together or bringing them into close proximity (e.g., typically no more than a few centimeters). NFC as described herein may also include other suitable short range wireless communication protocols such as Bluetooth or Zigbee.

A client device may use any suitable technique for encoding a representation of a credential within an NFC signal, such as a function or library routine. A NFC signal representing a credential may encode data including or representing a corresponding credential identifier and any other suitable data. In addition, a NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for a NFC signal, a client device transmits a NFC signal representing a credential. A validating device may then receive the signal at a receiver of the validating device and decode the NFC signal representing the credential to generate the set of alphanumeric characters encoded in the signal.

In some implementations, the validating device may then validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the NFC signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from a NFC signal locally without requiring interaction with a server. For example, the NFC signal may include a certificate associated with the client device of the user presenting the NFC signal for validation. Alternatively or in addition, the representation for the credential may be associated with a certificate that is already stored locally at the validating device. The validating device may then compare information decoded from the NFC signal with information from the certificate to determine that the NFC signal is valid.

Techniques for distributing, managing, and validating user credentials requiring third-party authorization are described in more below.

FIG. 1 shows a sample user interface 100 that enables a user to select from among various credentials belonging to the user. In some implementations, the various credentials may be issued by different organizations. In particular, the user interface 100 includes an example of a user's wallet (identified with a "User Wallet" caption 102) that provides the user with access to numerous different credentials associated with the user. For example, the user interface 100 includes a "Gym Membership Badge" 106 issued by Armstrong's Gym, and a "MicroStrategy Employee Badge" 108, a "MicroStrategy Headquarters 10$^{th}$ Floor Access Badge" 110, and a "MicroStrategy Headquarters Executive Suite Access Badge" 112 issued by MicroStrategy Incorporated. The user can select any one of these credentials from the user's wallet to output a representation of the credential from the user's client device. The user may make the selection, for example, by touching the corresponding area on a presence-sensitive display of the client device. The user can also select an Edit command button 104 to modify settings associated with the credentials, and can add a credential to the wallet by selecting command button 114.

FIG. 2 shows a sample representation of a credential. For example, when a user selects the "MicroStrategy Employee Badge" 108 shown in FIG. 1, assuming that any conditions associated with the credential (e.g., third-party authorizations) are satisfied, the selected badge 200 may be displayed on the client device as shown in FIG. 2. The badge 200 includes a caption 202 identifying it as an "Employee Badge" for "MicroStrategy Incorporated." Also included is an image of the user 204 and a caption 206 that identifies the associated user as "John Smith, Chief Operating Officer." In some implementations, the client device may obtain the user's image from, for example, a memory of the client device or a server. The badge 200 further includes a swiping slider 208 that may enable a user to select between different representations for the credential. A representation for a credential may be a depiction or rendering corresponding to a credential that enables the credential to be validated. For example, in the current position, the slider 208 causes an optical-machine readable representation for the credential 210 (e.g., a quick response (QR) code) to be displayed.

Figure 3:
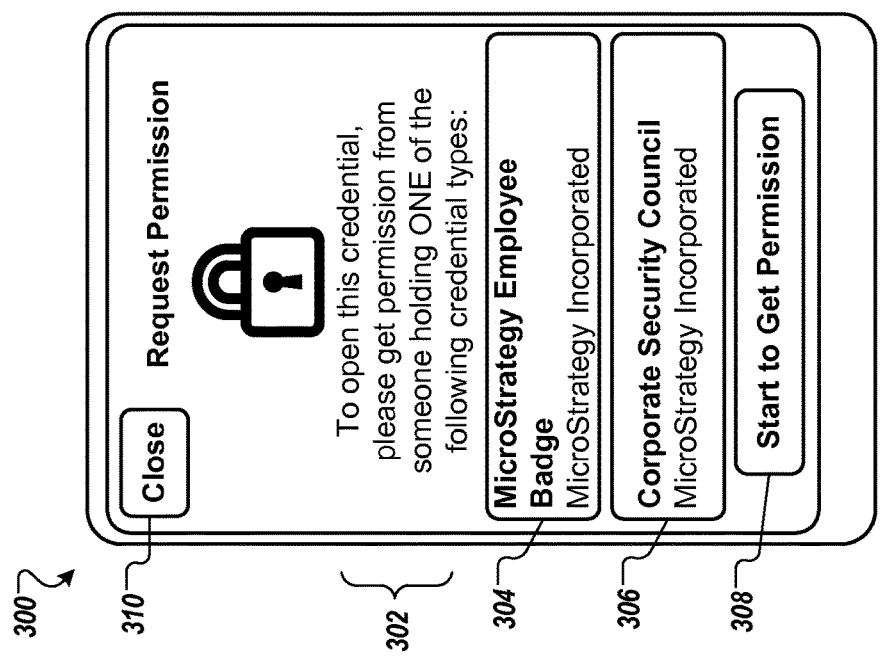
FIG. 3 is an illustration of an example of a user interface notifying a user that third-party authorization is required to access a credential.

FIG. 3 shows an example of a user interface 300 notifying a user that third-party authorization is required to access a credential. For example, assume that the credential identified as the "Employee Badge" 108 requires third-party authorization. More particularly, assume that the Employee Badge 108 required the user (e.g., a new employee) to obtain authorization from a third-party possessing a MicroStrategy Employee Badge or a Corporate Security Council Badge to become operational. When the new employee attempts to display the Employee Badge 108 (e.g., by touching the corresponding area on a presence-sensitive display of the client device), instead of showing the badge 200 as illustrated in FIG. 2, the client device displays the user interface 300 of FIG. 3.

The user interface 300 includes a caption 302 stating "To open this credential, please get permission from someone holding ONE of the following credential types." The user interface 300 shows command buttons identifying the third-parties who can provide authorization, which include a "MicroStrategy Employee Badge" button 304, and a "Corporate Security Council" button 306. As described below, in some implementations, the user can select the command buttons 304, 306 to receive assistance in locating third-parties holding the relevant credentials. The user interface also includes a "Start to Get Permission" command button 308 that initiates a validation mode on the client device. In validation mode, the client device validates a representation of a credential provided by a third-party. As described below, the user may operate his or her client device to receive representations for the third-party's credential. The client device can then validate the representation for the third-party's credential (e.g., locally and/or by communicating with a server).

FIG. 4 shows an example user interface 400 for validating a signal (e.g., an audible or ultrasonic sound signal, or a NFC signal) representing a credential.

Figure 6:
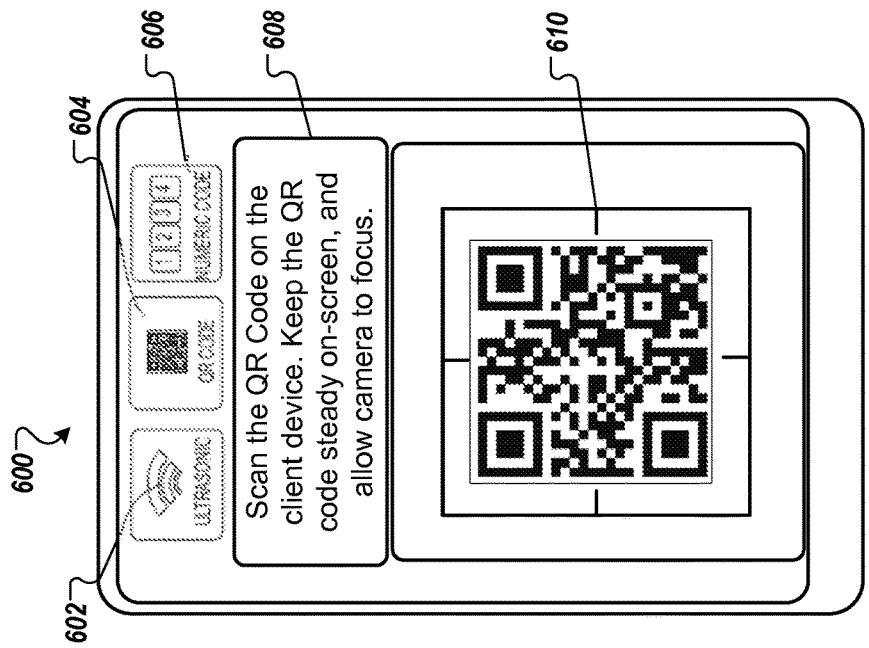
FIG. 6 is an illustration of an example user interface for validating an optical machine-readable representation for a credential.

The example user interface 400 enables a user to use the client device to validate a signal representing a credential presented by a third-party to obtain access to the user's credential. As described in greater detail below, the user interface 400 may enable the user to select from among, for example, different modes to validate different representations for credentials by inputting a gesture, e.g., selecting command buttons 402, 404, 406. Selection of the command button 402 may cause the user's client device to receive a signal (e.g. a sound signal or an NFC signal) generated at a client device of the third-party, where the signal encodes a representation for the third-party's credential (e.g., an alphanumeric code representing the third-party's credential). The user's client device may provide a graphical indication 410 as shown in FIG. 4 that the signal is being received. Selection of the command button 404 may cause the user's client device to display a reticle for scanning an optical machine-readable representation from a display of the third-party's client device as shown in FIG. 6. Selection of the command button 406 may cause the user's client device to provide an input screen that allows the user to enter an alphanumeric code representing the third-party's credential as shown in FIG. 8.

Referring again to FIG. 4, based on the selection of command button 402, the user interface 400 includes components that allow a user to validate a signal (e.g., a sound signal or NFC signal) outputted by a third-party's client device, where the signal encodes a representation for a third-party's credential. In particular, the user interface 400 includes a caption 408 instructing the user as follows: "To validate a credential, place phones in close proximity. The information will be transferred automatically." In an example operation, the user places a microphone coupled to the user's client device such that a sound signal being output by a speaker of the third-party's client device can be received. The user's client device displays a graphical indication 410 that the client device is ready to receive the sound signal. The client device receives and decodes the code encoded within the sound signal to obtain a set of alphanumeric characters. The client device then attempts to validate the credential (e.g., by requesting validation of the credential by communicating the set of alphanumeric characters to a server).

Figure 5:
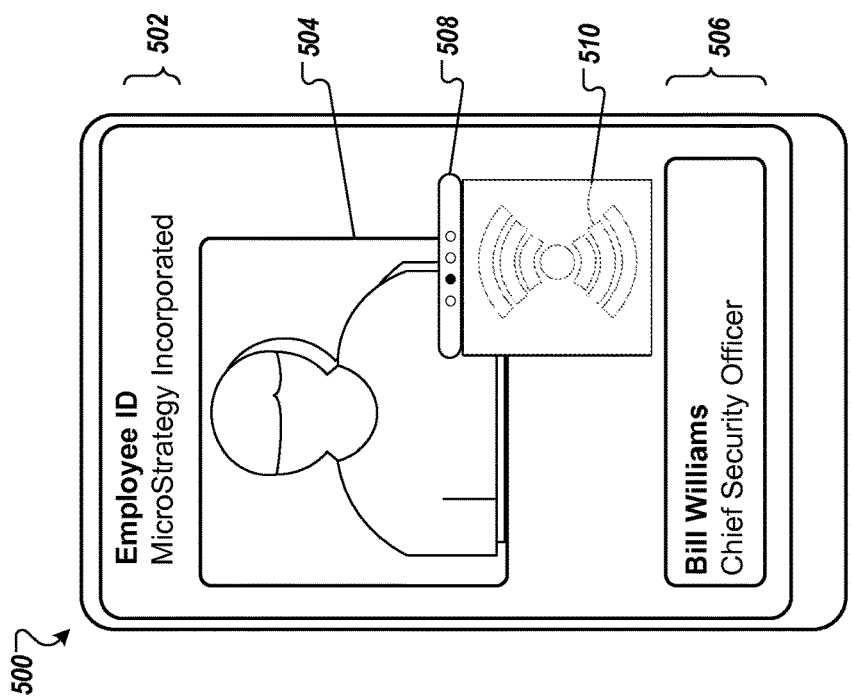
FIG. 5 is an illustration of an example user interface on a client device of a third party that provides a sound signal or near-field communication representing a third-party's credential.

FIG. 5 shows an example user interface 500 on a client device of a third-party that provides a signal (e.g., a sound signal or NFC signal) representing the third-party's credential. Continuing with the above example, the third-party's client device may show the user interface while outputting a signal representing the third-party's credential for the purpose of authorizing a user to access a credential. The user interface 500 includes a caption 502 indicating that the representation is an "Employee ID" for "MicroStrategy Incorporated." Also, the user interface 500 includes an image of the employee 504, and the name and title of the employee ("Bill Williams, Chief Security Officer") in a caption 506.

The third-party's client device may be configured to enable the third-party to select from among, for example, different representations for the credential by inputting a gesture, e.g., swiping slider 508 shown in FIG. 5. The second position of the slider 508 may cause the mobile application to display the user interface 500 and output a sound signal from a speaker of the third-party's client device or a NFC signal from a wireless transmitter of the third-party's client device. The signal encodes a code (e.g., an alphanumeric code) representing the third-party's credential. The first position of the slider 508 may cause the client device to display an optical machine-readable representation of the credential as shown in FIG. 7 (e.g., a quick response (QR) code or bar code).

For the user's client device to validate the representation provided by the third-party's client device, the validation mode selected at the user's client device should match the output mode of the third-party's client device. For example, if the user's client device is in a sound signal or NFC signal validation mode (e.g., the user selected command button 402) as illustrated in FIG. 4, then the third-party's client device should be set to output a sound signal or NFC signal representing the credential (e.g., the slider 508 should be in the second position) as illustrated in FIG. 5. If the user's client device is in an optical machine-readable representation validation mode (e.g., the user selected command button 404) as illustrated in FIG. 6 and described further below, then the third-party's client device should be set to output an optical machine-readable representation for the credential (e.g., the slider 508 should be in the first position) as illustrated in FIG. 7 and described further below.

Based on the position of the slider 508 in FIG. 5, the third-party's client device is configured to output a sound signal or NFC signal, and the user interface 500 includes a graphical indication 510 that a sound signal or NFC signal representing a credential is being outputted. As described above, a user's client device may receive and decode the sound signal or NFC signal, for example by receiving the sound signal at a microphone of the user's client device or receiving the NFC signal at a wireless receiver at the user's client device.

FIG. 6 shows an example user interface 600 for validating an optical machine-readable representation for a credential. The user interface 600 includes components that allow a user to use the client device to validate an optical machine-readable representation for a third-party's credential. In particular, the user interface 600 includes a caption 608 instructing the user to "Scan the QR code on the client device. Keep the QR code steady on-screen, and allow the camera to focus." In an example operation, the user orients a camera on his or her client device such that an optical machine-readable representation for a credential (e.g., a bar code or QR code) displayed on a third-party's client device is within a reticle 610 displayed on the user's client device. The user's client device scans and decodes the QR code (e.g., to obtain a set of alphanumeric characters). The user's client device then attempts to validate the credential (e.g., by communicating the set of alphanumeric characters to a server). The user interface 600 also includes command buttons 602, 604, 606 that enable a user to select among different modes to validate different representations for credentials as described above.

FIG. 7 shows an example user interface 700 on a client device of a third-party that provides an optical machine readable representation for the third-party's credential. Continuing with the above example, the user interface 700 shows a representation for a credential that the third-party's client device may present to authorize a user to access the user's credential that is subject to a third-party condition. The user interface 700 includes a caption 702 indicating that the representation is an "Employee ID" for "MicroStrategy Incorporated," an image of the employee 704, and the name and title of the employee ("Bill Williams, Chief Security Officer") in a caption 706. The user interface 700 also includes a slider 708 that enables the third-party to select from among different representations for the credential. In addition, the user interface 700 includes an optical machine-readable representation for a credential 710 (i.e., a QR code). As described above, the user's client device may capture and decode the optical machine-readable representation 710, for example by scanning the display of the third-party's client device (e.g., taking a photograph of the display) and decoding the optical machine-readable representation for the credential 710.

FIG. 8 shows an example user interface 800 for validating an alphanumeric code representing a third-party's credential. In particular, the user interface 800 includes a caption 808 instructing the user to "Enter the alphanumeric code below." The user interface 800 also includes an input field 810 and an input component 812 (e.g., an alphanumeric keypad) that provides its output to the input field 810. Also included is a submit command button 814 that causes the alphanumeric code stored in input field 810 to be submitted for validation (e.g., by causing the user's client device to transmit the alphanumeric code stored in the input field 810 to a server for validation). In an example operation, the third-party provides an alphanumeric code representing their credential to the user for validation. For example, the third-party may access the third party's employee badge shown in FIG. 9 on the third party's client device, where the badge includes the alphanumeric code. The third-party may then provide this code to the user by, for example, speaking the code (e.g., over the telephone or in-person), showing the screen of the third-party's client device to the user, or sending a short message service (SMS) message to the user with the code. The user then inputs the code into the input field 810 using input component 812 and presses the submit command button 814. The user's client device then attempts to validate the third-party's credential (e.g., by communicating the alphanumeric code to a server). The user interface 800 also includes command buttons 802, 804, 806 that enable a user to select among different modes to validate different representations for credentials as described above.

FIG. 9 shows an example user interface 900 on a client device of a third-party that provides an alphanumeric code representing a third-party's credential. Continuing with the above example, the user interface 900 shows an alphanumeric code that the third-party's client device may provide to authorize a user to access a credential. The user interface 900 includes a caption 902 indicating that the representation is an "Employee ID" for "MicroStrategy Incorporated," an image of the employee 904, and the name and title of the employee ("Bill Williams, Chief Security Officer") in a caption 906. The user interface 900 also includes a slider 908 that enables the third-party to select from among different representations for the credential. In addition, the user interface 900 shows an alphanumeric code (i.e., "23F567") representing a credential 910. As described above, the user may enter this code into the user's client device and submit the code for validation.

FIG. 10 shows an example screen 1000 notifying a user that the user has been authorized to access a credential. To continue the new employee example above, assume that a third-party possessing the "MicroStrategy Employee Badge" credential provided a representation for this credential to the new employee, who then successfully validated the third-party's credential on the new employee's client device. The new employee's client device may then show screen 1000 including a caption 1002 stating "Permission Accepted!" before navigating to a screen showing the desired credential (e.g., the "Employee Badge" illustrated in FIG. 2).

In the above example, the user is prevented from displaying the credential on the user's client device until a third-party authorizes the user to access the credential. However, the third-party conditions associated with a credential may be enforced in additional or alternative manners as described in more detail below. For example, in some implementations, a user may be able to display a credential regardless of whether the third-party conditions are satisfied. However, any attempt to validate the user's credential will result in a validating device determining that the user's credential is invalid until a third-party authorizes the user to use the credential.

Figure 11:
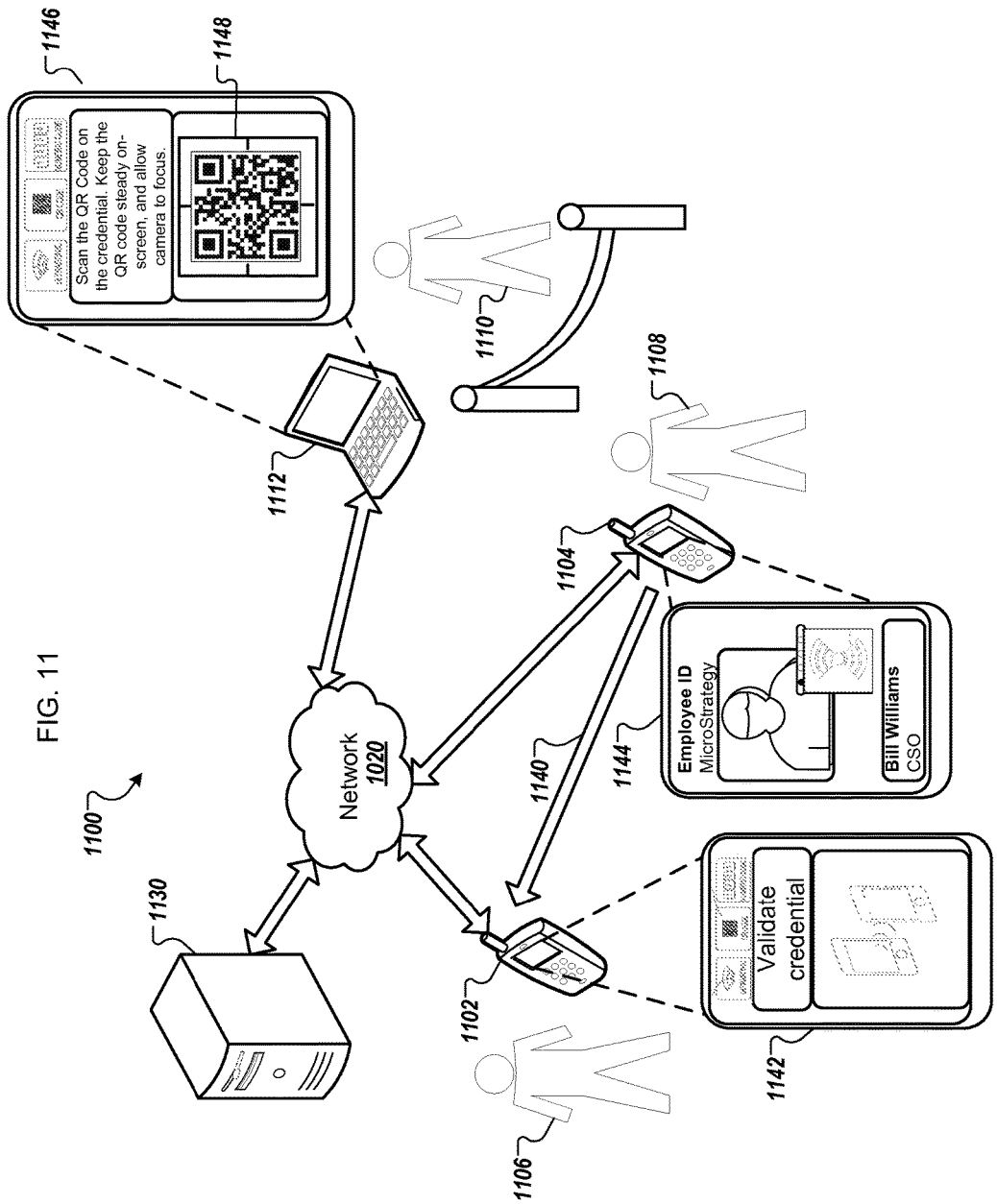
FIG. 11 is a diagram of an example system for management, distribution, and validation of user credentials.

FIG. 11 shows an example system 1100 for management, distribution, and validation of user credentials. As an overview, a server 1130 communicates via a network 1120 with a client device 1102 operated by a user 1106 and a client device 1104 operated by a third-party 1108. As illustrated in FIG. 11, when the user 1106 attempts to access a credential requiring third-party authorization, the user 1106 operates the client device 1102 to validate a credential presented by the third-party 1108. As part of validating the third party's 1108 credential, the client device 1102 of the user 1106 displays a validation screen 1142. In addition to communicating with client device 1102 and client device 1104, the server 1130 also communicates via network 1120 with a processing system 1112 operated by a validation entity 1110. Once the user 1106 has successfully unlocked the user's credential requiring third-party authorization, the user 1106 presents the unlocked credential to the validation entity 1110, and the validation entity 1110 operates the processing system 1112 to validate the credential presented by the user 1106 (e.g., by communicating with the server 1130 as described below).

In operation, the server 1130 manages and/or stores one or more credentials, associates users and groups of users with appropriate credentials, and provides the credentials to users' client devices and/or processing systems (e.g., operated by credential authorities) for validation. The server 1130 can be any suitable computer or collection of computers executing software capable of managing, distributing, and/or validating representations of credentials for users and groups of users via a network 1120 as described herein.

Credentials, user accounts, group accounts, and administrative accounts can be stored in a database (e.g., MySQL, PostgreSQL, MS SQL Server, MongoDB), or other suitable data structure that can be accessed by the server 1130. In some implementations, the server 1130 may access the stored credentials and/or user accounts via web services such as representational state transfer (REST) style services.

As an initial step, the server 1130 creates a credential based on input provided by a credential grantor (e.g., an employer). In some implementations, multiple different credential grantors (e.g., different entities and/or organizations) may issue credentials using the same server 1130. The credential may include a variety of information such as a credential identifier (e.g., a number or alphanumeric character string that uniquely identifies a credential), an indication of the grantor of the credential, information about the user to whom the credential grantor granted the credential, an indication of one or more permissions granted by the credential grantor to the user, a description of an event or location associated with the credential, and/or third-party conditions (i.e., information identifying one or more third-parties who may authorize a user to access the credential). In some implementations, the third-party conditions may include information identifying a type, classification, or rank of credential that can be used to unlock the credential. For example, a general employee badge for a company may be able to be unlocked by: (i) a general employee badge possessed by a third-party; and/or (ii) a manager or supervisor badge possessed by a third-party. Alternatively or in addition, the third-party conditions may include information identifying particular third-parties (e.g., names, credential identifiers, and/or user identifiers) who may unlock the credential. In some implementations, the third-party conditions also may include a temporal condition that identifies one or more time periods during which the third-party condition is active. For example, the credential may only have to be unlocked by a third-party during certain days and/or times. During other time periods, the credential may be accessible without first having to be unlocked by a third-party.

The server 1130 may present a suitable interface to the credential grantor for creation of credentials. For example, the server 1130 may present a web interface through which grantors can interact via a Web browser. In other aspects, the server 1130 may be directly accessible via a graphical-user interface or an application running on a mobile device. Any suitable interface can be used that enables the creation and storage of credentials, and user accounts. In addition (or as an alternative) to creation of credentials by credential grantors, credentials may be created at the request of registered users through a web-based or other interface, or through any other suitable mechanism such as sending email or short message service (SMS) transmissions to grantors. In some implementations, registered users may be able to create credentials by use of an application running on a client device.

The interface for the creation of credentials may provide a credential grantor the ability to associate conditions with the credentials. For example, the interface may show a hierarchical menu of potential third-parties who can grant access to the credential, and allow the credential grantor to identify the desired third-parties. These potential third-parties may be identified, for example, by name and/or by a type of credential the third-party must possess to unlock the credential. For example, the potential third-parties may include particular individuals such as "Bill Williams," and/or particular credentials such as "Corporate Security Council Badge" or "MicroStrategy Employee Badge."

In implementations that include a temporal condition, the temporal condition may identify, for example, a time period or multiple time periods during which the credential must be unlocked by a third-party. The time periods may be identified using any suitable format, such as, for example, by a specific date or range of dates and times (e.g., Dec. 25, 2012 from 9:00 am to 5:00 pm or Dec. 15, 2012 at 9:00 am to Dec. 31, 2012 at 5:00 pm), an expiration date and time (e.g., before Dec. 31, 2012 at 12:00 am), or a recurring day and time (e.g., every Monday through Friday from 9:00 am to 5:00 pm). The time periods may be stored in any suitable format. For example, a specific date or range of dates and times may include: a pair of dates plus times, a starting date and time plus a duration, or a pair of times since epoch. An expiration date and time may be identified by a date and time or a time since epoch. A recurring day and time may be represented as days of the week (e.g., in cron format with Sunday-Saturday represented by integers 0-6) and times (e.g., in 12 hour format such as 9:00 am to 5:00 pm or in 24 hour format such as 0900 to 1700).

In some implementations, the third-party conditions may be stored as any suitable data object, such as, for example, an eXtensible Markup Language (XML) or JavaScript Object Notation (JSON) object. A sample JSON object for a credential having third-party conditions requiring unlocking by "Bill Williams," a person holding a "Corporate Security Council Badge," or a person holding a "MicroStrategy Employee Badge," and which includes a temporal condition requiring unlocking on Monday to Friday from 0500 to 1300, and on Saturday and Sunday from 0600 to 0800 is shown below:

```
"third-party_authorization" : {
   "individual" : "Bill Williams",
   "credential" : [ "Corporate Security Council Badge",
       "MicroStrategy Employee Badge" ],
   "time_condition" : {
      "weekly" : [{ "week_days" : "1, 2, 3, 4, 5",
          "start_time" : "0500",
          "end_time" : "1300" },
        { "week_days" : "0, 6",
          "start_time" : "0600",
          "end_time" : "0800" }]}}
```

The server 1130 also may present an interface so that users and/or credential grantors can create user accounts for individual users and groups of users. For example, the server 1130 may present a web interface through which credential grantors can interact via a Web browser. Additionally or alternatively, the server 1130 may be directly accessible via a graphical-user interface or an application on a mobile device. User accounts may be stored in a table or collection of tables in a database, or in any other suitable data structure accessible by the server 1130. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

As an example, Mr. John Smith may request a new user account from the server 1130 using an application executing on his client device. The server 1130 can then create database entries representing a user account for Mr. Smith. A credential grantor could then create a row in another table for a group identified as employees of Company X. The grantor and/or server 1130 could then link the database entry for Mr. Smith to the group account for Company X through use of a linking table.

Once credentials and users, or groups of users, have been created, credential grantors and/or users can associate the credentials with users, or groups of users. For example, the server 1130 may present a web interface through which grantors can interact via a Web browser to link a given credential to a given user or group of users. In other aspects, the server 1130 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1130 also may notify the users that they have been associated with the credential(s), for example by pushing notifications to the respective users' client devices. Such notifications may include the credential identifier and/or a key for the user.

As described herein, a key may be any suitable alphanumeric code that is unique to a given user. For example, a key may be a symmetric key or shared secret between the client device and the server that can be used to maintain a private information link. In other implementations, the key may be a private key and/or public key that can be used with a public-key cryptographic system. The key may be of any suitable length such as, for example, 80 bits, 128 bits, or 256 bits. In some implementations, an application executing on the client device may have the key pre-installed, or may receive a key when a user first runs the application and creates a user account associated with the application, or may receive a key when a user logs into the application from the client device. In some implementations, the client device may receive the key from the server in a key exchange (e.g., a Diffie-Hellman key exchange).

Once credentials have been associated with appropriate user and/or group accounts, the credentials can then be distributed to client devices for the appropriate users via the network 1120. For example, the network 1120 may be a local area network ("LAN") and/or a wide area network ("WAN"), e.g., the Internet. In some versions, the server 1130 may communicate with the client devices via SMS or multimedia messaging service (MMS). The server 1130 may access user accounts in a database to locate the appropriate users' client devices.

Client devices 1102, 1104 can receive the credentials associated with their respective users 1106, 1108 and store them in any suitable memory for later retrieval. A given user 1106, 1108 may be associated with multiple different credentials, with each potentially being subject to different third-party authorization requirements. Furthermore, some or all of the credentials associated with a user 1106, 1108 may be accessible on a user's client device 1102, 1104. In particular, software applications executing on the client devices 1102 and 1104 can retrieve the credentials associated with users 1106 and 1108, respectively, so they can be used for generating and presenting a representation of the credential (e.g., to a validation entity for validation). The client devices 1102, 1104 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

FIG. 11 continues the example introduced above in which MicroStrategy has issued a new employee, Mr. John Smith (user 1106), a credential corresponding to an employee badge (e.g., for gaining entry into a place of business). The employee badge has a third-party authorization requirement such that it requires a third-party holding a specific credential to unlock the employee badge. As described above, Mr. Smith has identified Mr. Bill Williams (third-party 1108) as a person holding the appropriate credential to unlock the employee badge. The client device 1102 of user 1106 is executing an application that displays a user interface 1142 (similar to the user interface 400 shown in FIG. 4) including a screen for validating a sound signal or NFC signal representing a credential. Meanwhile, the client device 1104 of third-party 1108 is executing an application that displays a user interface 1144 indicating that the client device 1104 is outputting a sound signal or NFC signal.

To unlock the credential for Mr. Smith, Mr. Williams provides a representation of a credential from his client device 1104 to the client device 1102 of Mr. Smith. In this example, the representation is a sound signal or NFC signal 1140. The client device 1102 then validates the signal 1140 (e.g., by communicating with a server as described below). Once the client device 1102 validates the credential provided by client device 1104, the client device 1102 unlocks the employee badge for Mr. Smith. When the employee badge has been unlocked, Mr. Smith may be able to view the badge (e.g., access the representation for the credential shown in FIG. 2) and present the badge for validation. For example, Mr. Smith can then present the employee badge to a validation entity 1110. In the example illustrated in FIG. 11, the validation entity 1110 is a security guard responsible for permitting only authorized individuals to enter the place of business.

As described above, when a user 1106 or third-party 1108 desires to present a representation of a credential for validation, the user 1106 or third-party 1108 may input a command into the client device 1102, 1104 via a man-machine interface (e.g., a user interface on a presence-sensitive display). In response, an application executing on the client device 1102, 1104 then generates and outputs the representation (e.g., after any associated third-party conditions are satisfied).

In some implementations, third-party conditions associated with credentials are enforced locally at the client device 1102. In such implementations, the credentials and any conditions associated with the credentials may be stored locally at the client device 1102. When the user 1106 attempts to display a credential, the application identifies any third-party conditions associated with the credential and determines whether the conditions have been satisfied (e.g., the credential has been unlocked) before allowing the representation for the credential to be displayed. If the conditions have not been satisfied, the application informs the user that the credential must be unlocked and provides information identifying third-parties who may unlock the credential.

In some implementations, the client device 1102 may validate the representation for the credential provided by the third-party at the client device without requiring interaction with the server 1130. For example, the representation for the credential provided by the third-party may include a certificate associated with the third-party (e.g., a public key infrastructure (PKI) certificate). The client device 1102 may then decode the certificate from the representation of the third-party credential and determine that the certificate associated with the third-party is valid (e.g., by accessing a PKI system) and that the third-party credential represented by the representation satisfies the third-party condition associated with the credential.

The application may determine whether third-party conditions have been satisfied using any suitable technique. For example, the application may associate a "locked/unlocked" flag with each credential on the client device 1102, 1104 that indicates whether the associated credential is unlocked. When the client device 1102, 1104 initially receives a credential having third-party conditions, this flag will indicate that the credential is "locked." The user of the client device 1102, 1104 can then validate a third-party credential that satisfies the associated third-party conditions, which causes the application to change the flag to "unlocked."

When a credential is locked, the application may provide the user associated with the credential information identifying third-parties with authority to unlock the credential. For example, the application may identify such third-parties by name, credential type (e.g., badge type), image, current geographic location, and/or any suitable combination thereof. In some implementations, the application may display an interface that allows the user to select a third-party, and then provide an indication of the selected third-party's location (e.g., on a map) (e.g., using location information provided to the server 1130 by an application running on the third-party's client device). In some implementations, the application may provide a list of nearby third-parties (e.g., using location information provided to the server 1130 by applications running on the third-parties' client devices).

In some implementations, the logic for enforcing third-party conditions associated with credentials resides on a server (e.g., server 1130). In such implementations, the application on the client device 1102 may request permission to display a credential from the server 1130 before being able to display the credential. For example, the client device 1102 may automatically request permission from the server 1130 responsive to a user request to display a credential. Additionally, the information required to generate representations of the credentials may not be provided from the server 1130 to the client device 1102 until the appropriate third-party credential has been validated to unlock the credentials. In such implementations, the client device 1102 may first determine whether it currently has network connectivity as a prerequisite to outputting a representation for the credential.

Upon receiving a request for permission to display a credential from the client device 1130, the server 1130 may access a "locked/unlocked" flag associated with the credential at the server when it receives a request from a client device 1102 to output a representation for a credential. The server 1130 may then deny the request to output the representation if the flag indicates that the credential is currently "locked." The user of the client device 1102 can then validate a credential that satisfies the associated third-party conditions, which causes the server 1130 to change the flag to "unlocked." After the credential has been validated, the client device 1102 can then make a subsequent request to output the representation of the credential. The server 1130 then determines that the credential has been "unlocked" and sends a response to the client device 1102 granting permission to output the representation for the credential.

In some implementations, the client device 1102 may be able to present a representation for a credential regardless of any third-party conditions associated with the credential, but, when an attempt is made to validate such a credential for which a third-party condition has not been satisfied, the server 1130 may identify the credential as not satisfying the third-party condition and, therefore, indicate that the credential is invalid. In addition, the server 1130 may transmit a message to one or more client devices associated with the user associated with the credential to notify the user of the reason or reasons for which the credential was rejected. Advantageously, enforcing conditions in this manner may aid in enforcing the conditions even if a user 1106 has manipulated their client device 1102 to circumvent the conditions associated with the credential (e.g., by manipulating a locked/unlocked flag at the client device).

In some implementations, after a third-party credential has been used to unlock a user's credential with which a third-party condition is associated, the third-party associated with the third-party credential used to unlock the credential may be queried for confirmation that the third-party intends to unlock the credential of the user. For example, the server 1130 may transmit a message to a client device 1104 associated with the third-party 1108. The message can request that the third-party 1108 confirm that the third party 1108 intends to unlock the credential. The third-party then may affirmatively respond to the server 1130 to complete the unlocking the credential. Alternatively or in addition, the client device 1102 of the user may send a request to the client device 1104 of the third-party (e.g., via SMS or in-app notification) to obtain confirmation. After such third-party confirmation is received, the credential may be unlocked on client device 1102.

The server 1130 may maintain a log of third-party authorizations. For example, each time a third-party credential is used to validate a user credential, the server 1130 may store information recording the transaction in a database or log file. The database or log file may include information about the validation transaction such as the date, time, location, third-party validator's identity, and/or any combination thereof.

After a third-party credential has unlocked a credential associated with a third-party condition, the credential may remain unlocked for any suitable time period. In some implementations, the credential may remain unlocked for only a single use (e.g., the credential can only be validated one time for each third-party authorization). In such implementations, after the credential is presented for validation once, the credential may be returned to the locked state. In other implementations, the credential may remain unlocked as long as the credential remains open on the client device 1102. In such cases, after a user closes the credential in the mobile application, the user may have to unlock the credential again the next time the user desires to present and/or validate the credential. In still other implementations, the credential may remain unlocked until the mobile application on the client device 1102 is closed and/or the credential may remain unlocked indefinitely (e.g., as long as the credential is stored on the client device 1102).

When the third-party condition includes a temporal condition, the client device 1102 may obtain a current time derived from a timing device of the client device when a user attempts to access the credential. The time can be, for example, a current timestamp (e.g., seconds or milliseconds from epoch) obtained from a timing device such as a hardware or software clock located at the client device. Alternatively or in addition, when the client device 1102 has network connectivity, the application may poll another network device (e.g., a network time server) to determine the current time instead of relying on the time indicated by the client device 1102. Relying on the network device may be advantageous, for example, because a user may manipulate the time on the client device to circumvent temporal conditions.

The client device 1102 can then compare the current time with any temporal conditions associated with the credential. For example, assume that the credential is associated with a temporal condition so that it only requires third-party unlocking on Monday to Friday from 0500 to 1300 and on Saturday and Sunday from 0600 to 0800. If the current date and time at the client device is Monday at 0900, then, when the user attempts to present the credential, the client device 1102 determines whether the credential has been unlocked before displaying the credential. But, if the current date and time at the client device is Friday at 1700, then the client device 1102 displays the credential without making a determination as to whether the credential has been unlocked.

When the third-party conditions associated with a credential are satisfied, the client device 1102 may access the credential to perform various actions. For example, the client device 1102 may be able to display information associated with the credential (e.g., a photograph or depiction) and output a representation of the credential for validation by the validation entity 1110.

While shown in FIG. 11 as a person, the validation entity 1110 can be any agent capable of validating representations of credentials presented by users. As an example, the validation entity 1110 could be a software application executing on the processing system 1112 that processes a representation for a credential received from a client device 1102, decodes the representation to generate an alphanumeric set of characters, transmits the alphanumeric set of characters to the server 1130, and receives a response from the server 1130 indicating whether the representation is valid. The software application could then control a door lock and/or an automated gate to permit user 1106 to enter. The processing system 1112 can also be any suitable computer or set of computers capable of communicating with the server 1130 via network 1120, such as a mobile phone, smart phone, PDA, tablet computer, laptop or desktop computer, or other stationary or portable device, that includes one or more processors and non-transitory computer readable media.

Figure 12:
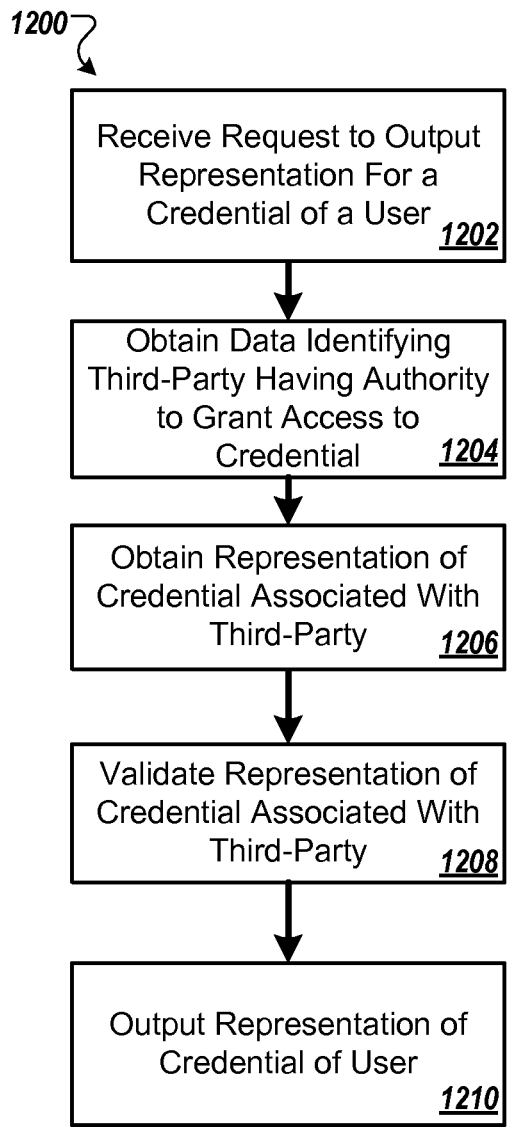
FIG. 12 is a flowchart of an example process for third-party authorization of a user credential.

FIG. 12 shows an example process 1200 for third-party authorization of a user credential. The process 1200 may be performed, for example, by the client device 1102 of FIG. 11. In step 1202, the client device 1102 receives a request from a user 1106 to output a representation for a credential of the user. The client device 1102 is associated with the user 1106.

In step 1204, in response to receiving the request, the client device 1102 obtains data identifying a third-party 1108 having authority to grant the user access to the credential of the user. The data may identify one or more specific individuals having authority to grant the user access to the credential of the user. In some implementations, the client device 1102 also provides location information for the one or more specific individuals having authority to grant the user access to the credential of the user. Alternatively or in addition, the data may identify a type of credential to be provided by the third-party to grant the user access to the credential of the user.

Then, in step 1206, the client device 1102 obtains a representation of a credential associated with the third-party. The representation of the credential for the third-party may be, for example, an optical machine-readable representation, an alphanumeric code, a sound signal, or a NFC signal. In one example, if the representation is an alphanumeric code, the user 1106 may receive the alphanumeric code from the third-party 1108 (e.g., in-person, over the telephone, or via SMS) and then enter the alphanumeric code using a keypad on the client device 1102.

In some implementations, the representation for the credential of the third-party may be a time-varying representation (e.g., a time-varying optical machine-readable representation, a sound signal or NFC signal encoding the time-varying representation, or a time-varying alphanumeric code). In such implementations, the client device 1102 may decode the time-varying representation for the credential to generate a set of alphanumeric characters, where the set of alphanumeric characters includes data corresponding to: (i) a key, (ii) a credential identifier, and (iii) a time at the client device of the third-party. The key may be associated with the third-party, and the credential identifier may identify the credential of the third-party represented by the credential representation.

Next, in step 1208, the client device 1102 validates the representation of the credential associated with the third-party. For example, where the representation for the credential is a time-varying representation, the client device 1102 may transmit a validation request to the server 1130 that includes data corresponding to the key, the credential identifier, and the time. The server 1130 receives the validation request message and then attempts to confirm that the set of alphanumeric characters derived for the time-varying representation of the credential is valid. In particular, the server 1130 may decode the set of alphanumeric characters to obtain the credential identifier. The server 1130 can then independently obtain the key of the user associated with the credential identifier (e.g., from a database by querying using the credential identifier) and the time from a timing device accessible to the server 1130. The server 1130 can then generate a set of alphanumeric characters using the credential identifier and the independently obtained key and time. Finally, the server 1130 can compare the generated set of alphanumeric characters with the set of alphanumeric characters included in the validation request.

If the generated set of alphanumeric characters matches the set of alphanumeric characters from the validation request message, then the server 1130 can generate a validation response message indicating that the time-varying representation of the credential was validated. When the timing device of the server 1130 is synchronized with the timing devices at the client device 1102, the set of alphanumeric characters generated at the server 1130 should be identical (or nearly identical) to those of the client devices 1102 when the credential identifiers and keys are the same. If the generated set of alphanumeric characters does not match the set of alphanumeric characters from the validation request message, the server's response indicates that the credential of the third-party 1108 was not validated.

The client device 1102 may then receive the validation response from the server. In some implementations, the client device 1102 initiates transmission of a message (e.g., sends a message or causes the server 1130 to send a message) requesting confirmation from the third-party that they intend to provide the user access to the user's credential. In such implementations, the client device 1102 or the server 1130 receives confirmation from a client device associated with the third-party that the third-party intends to grant the user access to the credential of the user. In some implementations, the client device 1102 may validate the representation for the credential provided by the third-party at the client device. For example, the client device 1102 may decode a certificate associated with the third-party from the representation of the credential and determine that the certificate associated with the third-party is valid.

In some implementations, the credential may not be stored at the client device 1102 until after the third-party credential has been validated. In such implementations, after the client device 1102 validates the representation of the credential associated with the user, the server 1130 transmits data to the client device 1102, where the data encodes the credential of the user. Finally, in response to validating the representation of the credential associated with the third-party, the client device 1102 outputs the representation for the credential of the user. For example, the client device 1102 may present an alphanumeric code representing the credential, render a sound signal or NFC signal representing the credential, or display an optical machine-readable representation for the credential.

In some implementations, multiple different credentials (some of which may have been granted by different credential grantors) may be accessible to a user from the user's client device, and at least some of the different credentials may be subject to different third-party conditions. For example, the user's client device may make two credentials accessible to the user. The first credential may be associated with a first condition requiring that the first credential be unlocked by one third-party, and the second credential may be associated with a second condition requiring that the second credential be unlocked by a different third-party. To use these credentials, the user may have the first third-party unlock the first credential and the second third-party unlock the second credential.

Some implementations involve one or more temporal conditions associated with the third-party condition. For example, the client device 1102 may obtain a time period during which third-party authorization is required to access a credential. In response to receiving a request from the user to output the representation for the credential of the user, the client device 1102 may determine that a current time is within the time period and obtain data identifying a third-party having authority to grant the user access to the credential of the user as a consequence.

In some implementations, the validation of the third-party's credential initiates a recording of information identifying the third-party who granted the user access to the credential of the user. For example, the server 1130 may log information identifying the third-party in a database or log file.

Implementations as disclosed herein may be useful in a variety of applications. As an example, assume that the credential is a ticket to an event for which a minor must be accompanied by an adult (e.g., an R-rated movie). In this example, the minor cannot present his/her ticket to gain entrance to the movie unless the ticket first has been "unlocked" by an adult, thereby demonstrating that the adult consents to the minor's entrance to the event. In this example, the credential includes a third-party condition requiring a third-party credential that may be issued by an organization that is different than the organization that issued the credential that needs to be unlocked. For example, the credential that needs to be unlocked may have been issued by a movie theater and the credential that is needed to unlock the locked credential may have been issued by the DMV (e.g., a driver's license demonstrating the age of the third party).

In another example, the credential may be a credential that grants the holder access to a secure facility (e.g., a credential that grants a marketing employee of a company to the company's secure skunkworks research facility) provided the holder is accompanied by someone else who has unconditional access to the facility (e.g., an engineer who is a member of the skunkworks research team). In this example, the holder of the credential cannot present the credential unless the credential first has been "unlocked" by someone with unconditional access to the facility, thereby demonstrating that the person with unconditional access to the facility consents to the credential holder entering the facility.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. One or more non-transitory computer-readable storage media including instructions that, when executed by one or more processors, cause the one or more processors to perform operations comprising:
    receiving, by a client device associated with a first user, a request to output a first credential representation that represents a particular user credential issued to the first user by a credential grantor;
    in response to receiving the request to output the first credential representation that represents the particular user credential issued to the first user, obtaining, by the client device, data identifying one or more third parties having authority to grant access to the particular user credential issued to the first user;
    receiving user input at the client device that indicates a selection of a validation mode from among multiple different validation modes for validating a second credential representation that represents a credential issued to one of the one or more third parties;
    obtaining, by the client device and according to the selected validation mode, the second credential representation that represents a credential issued to one of the one or more third parties by the credential grantor that issued the particular user credential to the first user, the one or more third parties having authority to grant access to the particular user credential issued to the first user;
    validating, by the client device, the second credential representation that represents the credential issued to the one of the one or more third parties; and
    in response to validating the second credential representation that represents the credential issued to the one of the one or more third parties, outputting, by the client device, the first credential representation that represents the particular user credential issued to the first user.

2. The one or more non-transitory computer-readable storage media of claim 1, wherein receiving, by the client device associated with the first user, the request to output the first credential representation that represents the particular user credential issued to the first user comprises:
    receiving, from the first user, a selection of the particular user credential issued to the first user from among the plurality of user credentials, two or more of the plurality of user credentials being associated with different credential grantors.

3. The one or more non-transitory computer-readable storage media of claim 1, wherein the operations further comprise:

receiving a selection of the one of the one or more third parties having authority to grant access to the particular user credential issued to the first user, the one or more third parties including users other than the first user and not including the credential grantor, the second credential representation representing a credential issued to one of the users other than the first user; and receiving a request for location information indicative of a location of the one of the one or more third parties having authority to grant access to the particular user credential issued to the first user.

4. The one or more non-transitory computer-readable storage media of claim 1, wherein the operations further comprise:

providing, by the client device, a user interface indicating the different validation modes used to validate different types of credential representations; and wherein validating the second credential comprises determining that the selected validation mode of the client device matches a validation mode of a device associated with the one of the one or more third parties.

5. The one or more non-transitory computer-readable storage media of claim 1, wherein the validation mode is selected from the group consisting of an alphanumeric validation mode, a quick response (QR) code validation mode, a sound wave validation mode, and a near field communication (NFC) validation mode.

6. The one or more non-transitory computer-readable storage media of claim 1, wherein validating, by the client device, the second credential representation that represents the credential issued to the one of the one or more third parties comprises:

decoding data from the obtained second credential representation that represents the credential issued to one of the one or more third parties to obtain a credential identifier;

determining that the obtained credential identifier matches a stored credential identifier corresponding to the second credential issued to one of the one or more third parties; and displaying, on the client device, an indication that the second credential representation that represents the credential issued to the one of the one or more third parties is validated.

7. The one or more non-transitory computer-readable storage media of claim 6, wherein:

the second credential representation that represents the credential issued to one of the one or more third parties is a time-varying credential representation;

decoding data from the obtained second credential representation that represents the credential issued to one of the one or more third parties comprises obtaining a time stamp from the decoded second credential representation that represents the credential issued to one of the one or more third parties; and validating the second credential representation that represents the credential issued to the one of the one or more third parties further comprises determining that a time at which the second credential representation that represents the credential issued to the one of the one or more third parties is being validated is within a time period indicated by the time stamp.

8. The one or more non-transitory computer-readable storage media of claim 1, wherein obtaining, by the client device, the second credential representation that represents the credential issued to the one of the one or more third parties having authority to grant access to the particular user credential issued to the first user comprises obtaining, by the client device associated with the first user from the third party, an alphanumeric code representing the credential issued to the one of the one or more third parties according to the selected validation mode; and wherein validating, by the client device, the second credential representation that represents the credential issued to the one of the one or more third parties comprises:

transmitting, from the client device associated with the first user, a validation request to a server, wherein the validation request includes the alphanumeric code; and receiving a validation response from the server, the validation response indicating that the credential issued to the one of the one or more third parties is validated.

9. The one or more non-transitory computer-readable storage media of claim 8, wherein the operations further comprise:

obtaining, by the client device, a time period during which third party authorization is required to access the credential; and wherein, in response to receiving the request to output the first credential representation that represents the particular user credential issued to the first user, obtaining, by the client device, the data identifying the one or more third parties having authority to grant access to the particular user credential issued to the first user comprises:

determining that a current time is within the time period; and in response to receiving the request to output the first credential representation that represents the particular user credential issued to the first user and having determined that the current time is within the time period, obtaining, by the client device, the data identifying the one or more third parties having authority to grant access to the particular user credential issued to the first user.

10. The one or more non-transitory computer-readable storage media of claim 9, wherein the data identifying the one or more third parties having authority to grant access to the particular user credential issued to the first user comprises data identifying one or more specific individuals having authority to grant access to the particular user credential issued to the first user.

11. The one or more non-transitory computer-readable storage media of claim 1, wherein the operations further comprise, in response to validating the second credential representation that represents the credential issued to the one of the one or more third parties, receiving, by the client device from a server, data encoding the particular user credential issued to the first user;

wherein the request to output the first credential representation corresponds to a user selection of a particular type of credential representation from among a plurality of different types of credential representations for the particular user credential issued to the first user.

12. The one or more non-transitory computer-readable storage media of claim 1, wherein obtaining the data identifying one or more third parties having authority to grant access to the particular user credential issued to the first user comprises:

obtaining data identifying (i) respective locations of the one or more third parties, and (ii) types of credentials respectively issued to the one or more third parties.

13. A system comprising:
one or more processors and one or more non-transitory computer-readable storage media storing instructions that are operable and when executed by the one or more processors, cause the one or more processors to perform operations comprising:
receiving, by a client device associated with a first user, a request to output a first credential representation that represents a particular user credential issued to the first user by a credential grantor;
in response to receiving the request to output the first credential representation that represents the particular user credential issued to the first user, obtaining, by the client device, data identifying one or more third parties having authority to grant access to the particular user credential issued to the first user;
receiving user input at the client device that indicates a selection of a validation mode from among multiple different validation modes for validating a second credential representation that represents a credential issued to one of the one or more third parties;
obtaining, by the client device and according to the selected validation mode, the second credential representation that represents a credential issued to one of the one or more third parties by the credential grantor that issued the particular user credential to the first user, the one or more third parties having authority to grant access to the particular user credential issued to the first user;
validating, by the client device, the second credential representation that represents the credential issued to the one of the one or more third parties; and
in response to validating the second credential representation that represents the credential first credential representation that represents the particular user credential issued to the first user.

14. The system of claim 13, wherein the operations further comprise:
receiving a selection of the one of the one or more third parties having authority to grant access to the particular user credential issued to the first user, the one or more third parties including users other than the first user and not including the credential grantor, the second credential representation representing a credential issued to one of the users other than the first user; and
receiving a request for location information indicative of a location of the one of the one or more third parties having authority to grant access to the particular user credential issued to the first user.

15. The system of claim 13,
wherein:
the validation mode is selected from the group consisting of a alphanumeric validation mode, a quick response (QR) code validation mode, a sound wave validation mode, and a near field communication (NFC) validation mode; and
wherein validating, by the client device, the second credential representation that represents the credential issued to the one of the one or more third parties comprises:
determining that the selected validation mode of the client device matches a validation mode of a device associated with the one of the one or more third parties.

16. The system of claim 13, wherein validating, by the client device, the second credential representation that represents the credential issued to the one of the one or more third parties comprises:
decoding data from the obtained second credential representation that represents the credential issued to one of the one or more third parties to obtain a credential identifier;
determining that the obtained credential identifier matches a stored credential identifier corresponding to the credential issued to one of the one or more third parties; and
displaying, on the client device, an indication that the second credential representation that represents the credential issued to the one of the one or more third parties is validated.

17. A computer-implemented method comprising:
receiving, by a client device associated with a first user, a request to output a first credential representation that represents a particular user credential issued to the first user by a credential grantor;
in response to receiving the request to output the first credential representation that represents the particular user credential issued to the first user, obtaining, by the client device, data identifying one or more third parties having authority to grant access to the particular user credential issued to the first user;
receiving user input at the client device that indicates a selection of a validation mode from among multiple different validation modes for validating a second credential representation that represents a credential issued to one of the one or more third parties;
obtaining, by the client device and according to the selected validation mode, the second credential representation that represents a credential issued to one of the one or more third parties by the credential grantor that issued the particular user credential to the first user, the one or more third parties having authority to grant access to the particular user credential issued to the first user;
validating, by the client device, the second credential representation that represents the credential issued to the one of the one or more third parties; and
in response to validating the second credential representation that represents the credential issued to the one of the one or more third parties, outputting, by the client device, the first credential representation that represents the particular user credential issued to the first user.

18. The computer-implemented method of claim 17, wherein the operations further comprise:
receiving a selection of the one of the one or more third parties having authority to grant access to the particular user credential issued to the first user, the one or more third parties including users other than the first user and not including the credential grantor, the second credential representation representing a credential issued to one of the users other than the first user; and
receiving a request for location information indicative of a location of the one of the one or more third parties having authority to grant access to the particular user credential issued to the first user.

19. The computer-implemented method of claim 17, wherein:
the validation mode is selected from the group consisting of a alphanumeric validation mode, a quick response (QR) code validation mode, a sound wave validation mode, and a near field communication (NFC) validation mode; and wherein validating, by the client device, the second credential representation that represents the credential issued to the one of the one or more third parties comprises:

determining that the selected validation mode of the client device matches a validation mode of a device associated with the one of the one or more third parties.

20. The computer-implemented method of claim 17, wherein validating, by the client device, the second credential representation that represents the credential issued to the one of the one or more third parties comprises:

decoding data from the obtained second credential representation that represents the credential issued to one of the one or more third parties to obtain a credential identifier;

determining that the obtained credential identifier matches a stored credential identifier corresponding to the credential issued to one of the one or more third parties; and displaying, on the client device, an indication that the second credential representation that represents the credential issued to the one of the one or more third parties is validated.

* * * * *

UNITED STATES PATENT AND TRADEMARK OFFICE
CERTIFICATE OF CORRECTION

Page 1 of 1

PATENT NO. : 10,027,680 B1
APPLICATION NO. : 14/853623
DATED : July 17, 2018
INVENTOR(S) : Michael J. Saylor It is certified that error appears in the above-identified patent and that said Letters Patent is hereby corrected as shown below:

In the Claims

Column 27, Line 36, Claim 13, after "represents the credential" insert -- issued to the one of the one or more third parties, outputting, by the client device, the --.

Signed and Sealed this
Fifth Day of May, 2020

Andrei Iancu
*Director of the United States Patent and Trademark Office*